(12) United States Patent
Beasley et al.

(10) Patent No.: US 9,864,991 B2
(45) Date of Patent: Jan. 9, 2018

(54) METHOD AND APPARATUS FOR SECURE TRANSACTION MANAGEMENT

(75) Inventors: Garland B. Beasley, El Dorado, AR (US); Charles Jarrett, El Dorado, AR (US); Alan Anderson, El Dorado, AR (US); Jay Jacobson, El Dorado, AR (US); Raymond Dalton, El Dorado, AR (US); Brian Bates, El Dorado, AR (US)

(73) Assignee: MURPHY OIL USA, INC., El Dorado, AR (US)

( * ) Notice: Subject to any disclaimer, the term of this patent is extended or adjusted under 35 U.S.C. 154(b) by 1385 days.

(21) Appl. No.: 12/564,356

(22) Filed: Sep. 22, 2009

(65) Prior Publication Data

US 2011/0071914 A1    Mar. 24, 2011

(51) Int. Cl.
| | |
|---|---|
| *G06G 1/12* | (2006.01) |
| *G06Q 20/40* | (2012.01) |
| *G06Q 20/10* | (2012.01) |
| *G06Q 20/20* | (2012.01) |
| *G06Q 20/32* | (2012.01) |
| *G06Q 20/38* | (2012.01) |

(Continued)

(52) U.S. Cl.
CPC .......... *G06Q 20/40* (2013.01); *G06Q 20/105* (2013.01); *G06Q 20/202* (2013.01); *G06Q 20/32* (2013.01); *G06Q 20/3223* (2013.01); *G06Q 20/385* (2013.01); *G06Q 40/02* (2013.01); *G06Q 40/08* (2013.01)

(58) Field of Classification Search
None
See application file for complete search history.

(56) References Cited

U.S. PATENT DOCUMENTS

| | | |
|---|---|---|
| 7,376,583 B1 | 5/2008 | Rolf |
| 7,689,508 B2 | 3/2010 | Davis et al. |
| 7,774,123 B2 | 8/2010 | Schröder |

(Continued)

FOREIGN PATENT DOCUMENTS

| | | |
|---|---|---|
| EP | 1 367 516 A1 | 12/2003 |
| GB | 2 371 665 A | 7/2002 |

(Continued)

OTHER PUBLICATIONS

*Cosmos Bank partners with PayMate for Mobile Payment Sols*; [online], [retrieved on Mar. 20, 2009]. Retrieved from the Internet <URL: http://www.moneycontrol.com/india/news/pressnews/cosmos-bank-partnerspaymate-for-mobile-payment-sols/22/27/322748>; 4 sheets.

(Continued)

*Primary Examiner* — Paul Danneman
(74) *Attorney, Agent, or Firm* — Alston & Bird LLP

(57) ABSTRACT

Methods and apparatuses for secure transaction management are provided. An example method may include verifying that a mobile terminal identifier is registered with an account, generating an authorization code, and verifying that the received authorization code matches the authorization code stored in association with the account, and the received customer verification number matches the customer verification number associated with the account. The example method may also include providing for transmission of a verification reply to authorize the transaction.

23 Claims, 5 Drawing Sheets

(51) Int. Cl.
  *G06Q 40/02* (2012.01)
  *G06Q 40/08* (2012.01)

(56) References Cited

U.S. PATENT DOCUMENTS

| | | |
|---|---|---|
| 7,784,684 B2 | 8/2010 | Labrou et al. |
| 7,793,829 B2 | 9/2010 | Randazza et al. |
| 7,822,688 B2 | 10/2010 | Labrou et al. |
| 7,848,980 B2 | 12/2010 | Carlson |
| 7,933,799 B2 | 4/2011 | Aaltonen et al. |
| 7,988,040 B2 | 8/2011 | Randazza et al. |
| 8,205,791 B2 | 6/2012 | Randazza et al. |
| 8,393,536 B2 | 3/2013 | Randazza et al. |
| 8,490,865 B2 | 7/2013 | Randazza et al. |
| 2003/0009243 A1 | 1/2003 | Dittmann |
| 2004/0267618 A1 | 12/2004 | Judicibus et al. |
| 2005/0240418 A1* | 10/2005 | Chappuis .................. 705/1 |
| 2005/0250538 A1 | 11/2005 | Narasimhan et al. |
| 2007/0061256 A1 | 3/2007 | Park et al. |
| 2007/0175978 A1 | 8/2007 | Stambaugh |
| 2007/0233615 A1 | 10/2007 | Tumminaro |
| 2007/0272739 A1 | 11/2007 | Randazza et al. |
| 2007/0282690 A1 | 12/2007 | Randazza et al. |
| 2008/0010215 A1 | 1/2008 | Rackley, III et al. |
| 2008/0011825 A1 | 1/2008 | Giordano et al. |
| 2008/0040265 A1 | 2/2008 | Rackley, III et al. |
| 2008/0046366 A1 | 2/2008 | Bemmel et al. |
| 2008/0086412 A1 | 4/2008 | Randazza et al. |
| 2008/0275799 A1 | 11/2008 | Randazza et al. |
| 2008/0319905 A1 | 12/2008 | Carlson |
| 2009/0055319 A1 | 2/2009 | Raheman |
| 2009/0057393 A1 | 3/2009 | Merkow et al. |
| 2009/0063312 A1 | 3/2009 | Hurst |
| 2010/0041368 A1* | 2/2010 | Kumar .................. G06Q 20/02 455/407 |
| 2010/0042538 A1 | 2/2010 | Dheer et al. |
| 2010/0312703 A1 | 12/2010 | Kulpati et al. |
| 2011/0078081 A1 | 3/2011 | Pirzadeh et al. |
| 2011/0093351 A1 | 4/2011 | Afana |
| 2013/0268381 A1 | 10/2013 | Randazza et al. |

FOREIGN PATENT DOCUMENTS

| | | |
|---|---|---|
| WO | WO-03/009243 A1 | 1/2003 |
| WO | WO 2007/004794 A1 | 1/2007 |
| WO | WO 2007/083319 A2 | 7/2007 |
| WO | WO 2008/008037 A1 | 1/2008 |

OTHER PUBLICATIONS

Kahte, Atul; *Mobile Payments—Express Computer*; Sep. 8, 2009; [online]; [accessed on Mar. 20, 2009]; [retrieved on Aug. 3, 2009]; Retrieved from the Internet <URL: http://www.expresscomputeronline.com/20080908/technology02.shtml>; 6 sheets.

*Payment on the Go*; [online]; [retrieved on Mar. 20, 2010]; Retrieved from the Internet <URL: http://www.2mpayment.com/pdf/product%20brochure.pdf>; 4 sheets.

Amca, Hassan, , et al; "Using Mobile Telephone as an Operator Independent, Secure Micro-Payment Tool"; From the Book Entitled "Novel Algorithms and Techniques in Telecommunications, Automation and Industrial Electronics"; Published by Springer Netherlands; Copyright 2008; pp. 370-374.

* cited by examiner

METHOD AND APPARATUS FOR SECURE TRANSACTION MANAGEMENT

TECHNOLOGICAL FIELD

Embodiments of the present invention relate generally to secure financial transactions. More particularly, embodiments of the present invention relate to the management of financial transactions having multi-factor security and verification useful for the purchase and sale of products and services, including commodity goods.

BACKGROUND

Commercial businesses continuously look for mechanisms and techniques that provide convenience to their customers, particularly with respect to performing convenient retail transactions. As a result, customers have begun to demand more convenience, and convenience has become an increasingly important factor when customers are considering where to purchase goods and services. Retail outlets, whether online or brick and mortar, that provide their customers with higher degrees of convenience often hold a competitive advantage over those retail outlets that do not.

Despite the high value that today's customers place on convenience, other considerations that arise as a result of providing convenience to customers must be considered by retail outlets. Often, as a result of providing customers with an added degree of convenience, the security of a customer's finances can be detrimentally affected. Gone are the days where the financial implications of having a wallet stolen are capped by the amount of cash that was contained in the wallet at the time. The convenience associated with credit or debit cards also carry that risk of substantial financial implications when account numbers and passcodes are stolen.

Additionally, an increasing number of financial transactions are handled via a network, such as the Internet. As more and more transactions take place, the level of vulnerability to hackers and thieves to acquire sensitive information such as account numbers, passcodes, and personal identification numbers also increases. In this regard, a virtual stolen wallet is equally, if not more, dangerous to a customer's finances.

Retail outlets, as well as other entities involved in transactions with sensitive information, such as account numbers and passcodes, must consider the information security implications that arise from providing these conveniences to customers. Accordingly, solutions that provide convenience in a manner that maintains a high degree of information security are advantageous.

BRIEF SUMMARY OF SOME EXAMPLES OF THE INVENTION

Methods and apparatus for secure transaction management are provided. In this regard, example embodiments of the present invention implement a multiple factor verification sequence that authorizes a user to perform a transaction. The multiple, separate factors involved in the authorization process may include a mobile terminal identifier (e.g., a phone number), an authorization code that is generated specifically for a single transaction, and a customer verification number. According to various example embodiments, verification that a mobile terminal identifier associated with an authorization request is registered may cause the generation of an authorization code for a transaction. The authorization code and a customer verification number may be provided to a point of sale terminal, for example via user input, which in turn, may verify the authorization code and the customer verification number before permitting the transaction. Subsequent to authorization, funds for the transaction may be accessed via a network connection.

According to one example embodiment, an example method is provided. The example method may include receiving an authorization code request and a received mobile terminal identifier to initiate a transaction, where the received mobile terminal identifier is associated with a mobile terminal. The example method may also include verifying that the mobile terminal identifier is registered with an account. In this regard, the mobile terminal identifier and a customer verification number may be associated with the account. Also, the customer verification number need not have been and preferably would not be included in the authorization code request. Further, the example method may include generating an authorization code associated with the account in response to verifying that the mobile terminal identifier is registered, storing the authorization code in association with the account, and providing for transmission of the authorization code to the mobile terminal. The example method may further include receiving a verification request from a point of sale terminal. In this regard, the verification request may include a received authorization code, and a received customer verification number provided to the point of sale terminal by a user. Further, the example method may include verifying that the received authorization code matches the authorization code stored in association with the account, and the received customer verification number matches the customer verification number associated with the account, and providing for transmission of a verification reply to the point of sale terminal to authorize the transaction, in response to verifying that the received authorization code and the received customer verification number match the authorization code stored in association with the account and the customer verification number associated with the account.

Another example embodiment of the present invention is an example apparatus configured to manage a secure transaction. The example apparatus may comprise a processor. The processor may be configured to receive an authorization code request and a mobile terminal identifier to thereby initiate a transaction, where the mobile terminal identifier is associated with a mobile terminal, and verify that the mobile terminal identifier is registered with an account. In this regard, the mobile terminal identifier and a customer verification number may be associated with the account, and the customer verification number need not have been included in the authorization code request. The processor may be configured to generate an authorization code associated with the account in response to verifying that the mobile terminal identifier is registered, store the authorization code in association with the account, and provide for transmission of the authorization code to the mobile terminal. Further, the processor may be configured to receive a verification request from a point of sale terminal, where the verification request includes a received authorization code, and a received customer verification number provided to the point of sale terminal by a user. The processor may also be configured to verify that the received authorization code matches the authorization code stored in association with the account, and the received customer verification number matches the customer verification number associated with the account, and provide for transmission of a verification reply to the point of sale terminal to thereby authorize the transaction, in response to verifying that the received authorization code and the received customer verification number match the authorization code stored in association with the account and the customer verification number associated with the account.

Yet another example embodiment of the present invention is a computer-readable storage medium having executable computer-readable program code instructions stored therein. The computer-readable program code instructions may be configured to cause an apparatus to perform various functionalities. In this regard, the instructions may be configured to cause the apparatus to receive an authorization code request and a mobile terminal identifier to thereby initiate a transaction, where the mobile terminal identifier being associated with a mobile terminal, and verify that the mobile terminal identifier is registered with an account. In this regard, the mobile terminal identifier and a customer verification number may be associated with the account, and the customer verification number need not have been included in the authorization code request. The instructions may be further configured to cause the apparatus to generate an authorization code associated with the account in response to verifying that the mobile terminal identifier is registered, store the authorization code in association with the account, and provide for transmission of the authorization code to the mobile terminal. Further, the instructions may be configured to cause the apparatus to receive a verification request from a point of sale terminal, where the verification request includes a received authorization code and a received customer verification number provided to the point of sale terminal by a user. The instructions may also be configured to verify that the received authorization code matches the authorization code stored in association with the account, and the received customer verification number matches the customer verification number associated with the account, and provide for transmission of a verification reply to the point of sale terminal to thereby authorize the transaction, in response to verifying that the received authorization code and the received customer verification number match the authorization code stored in association with the account and the customer verification number associated with the account.

The above summary is provided merely for purposes of summarizing some example embodiments of the invention to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those summarized.

BRIEF DESCRIPTION OF THE DRAWINGS

Figure 1:
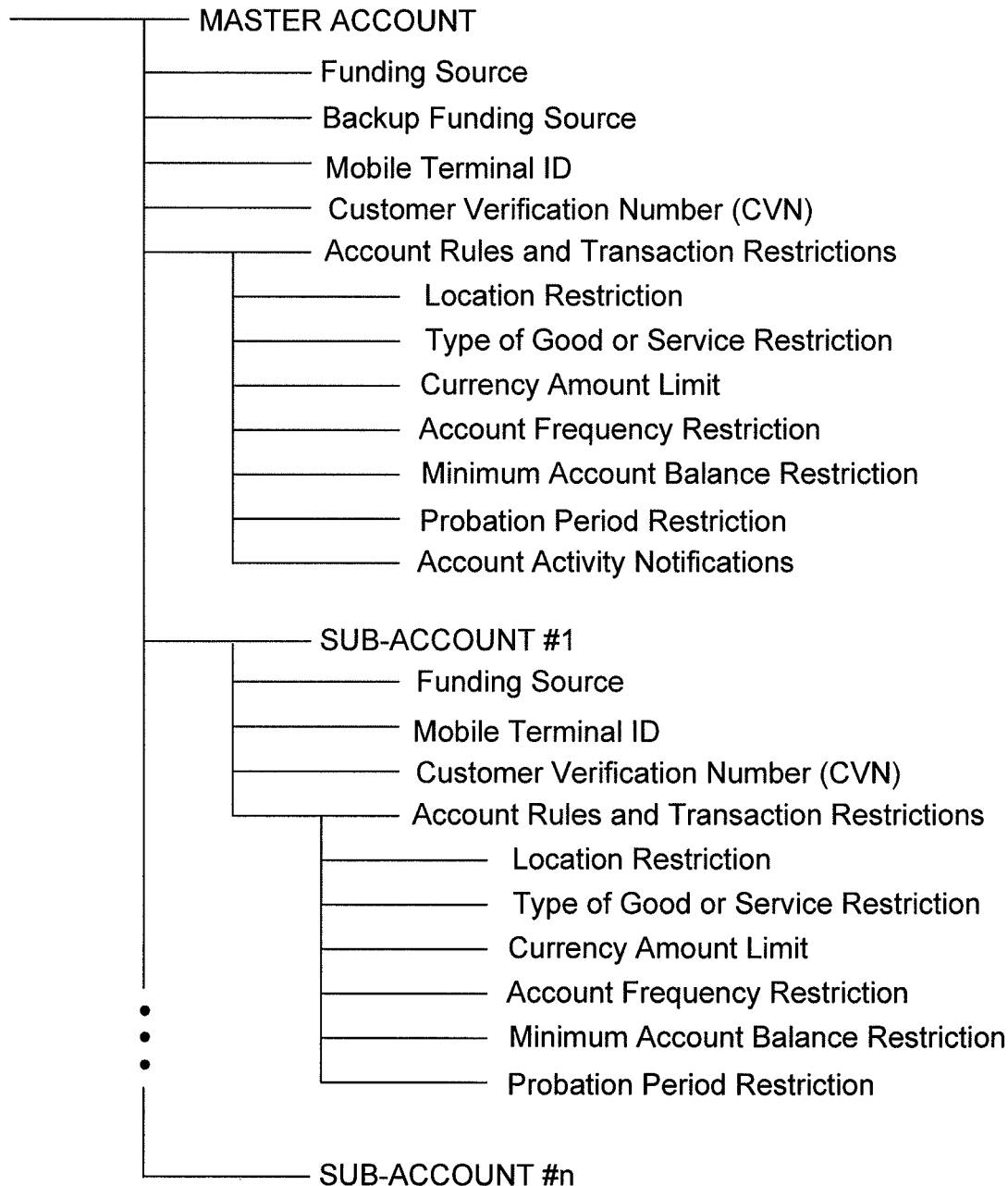
Figure 2:
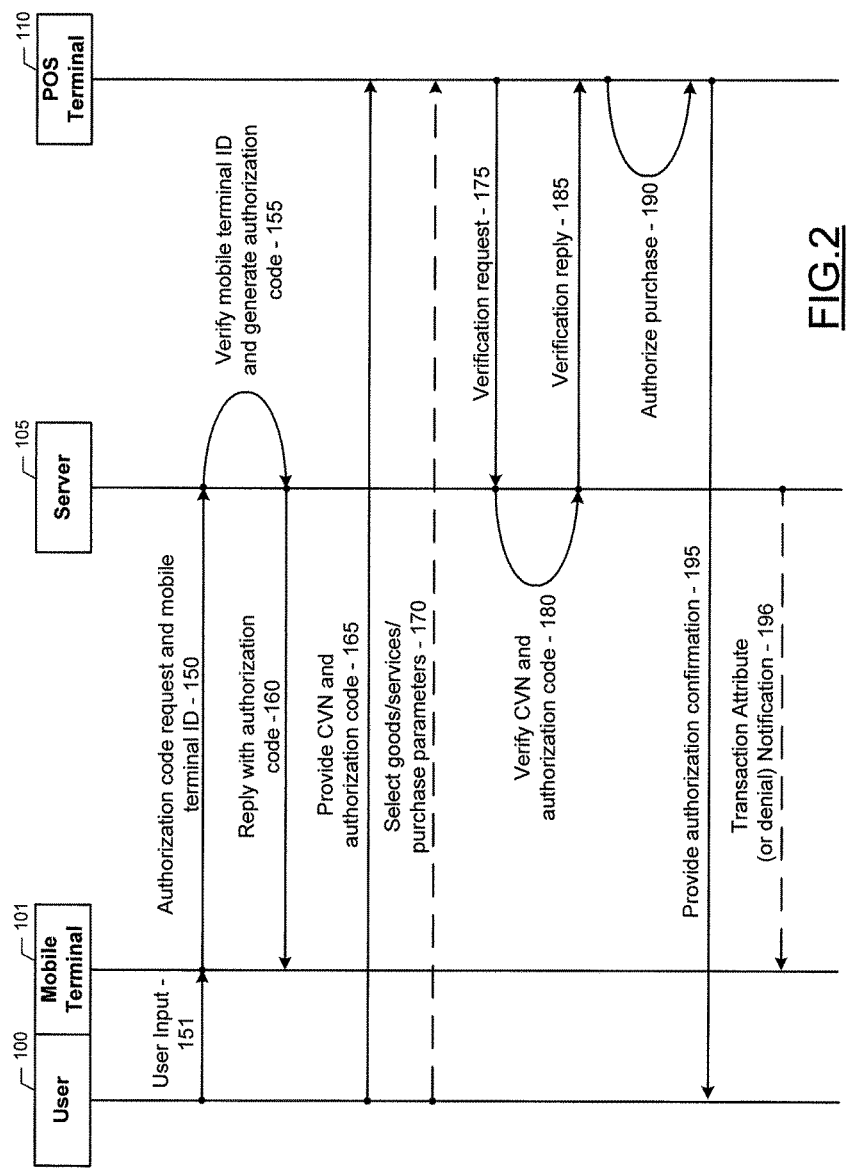
Figure 3:
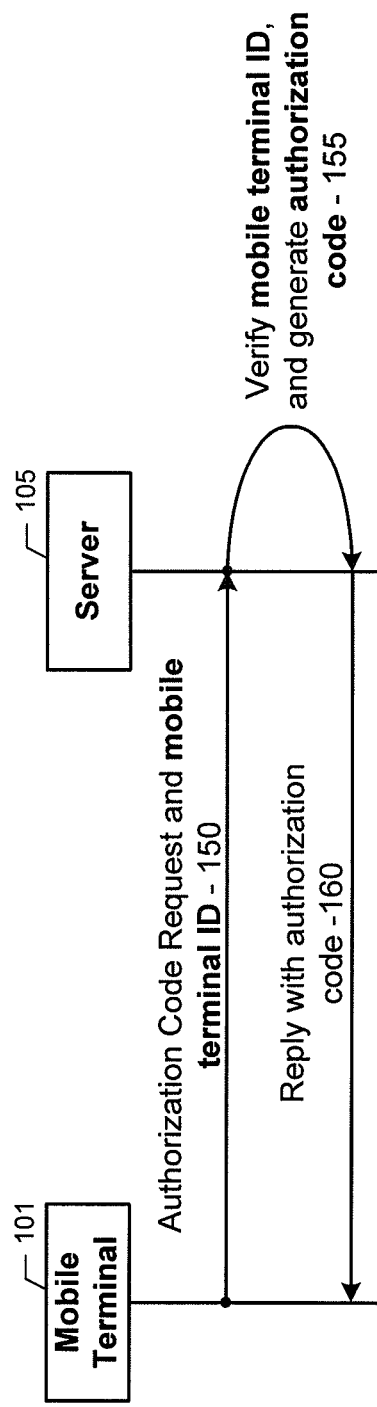
Figure 4:
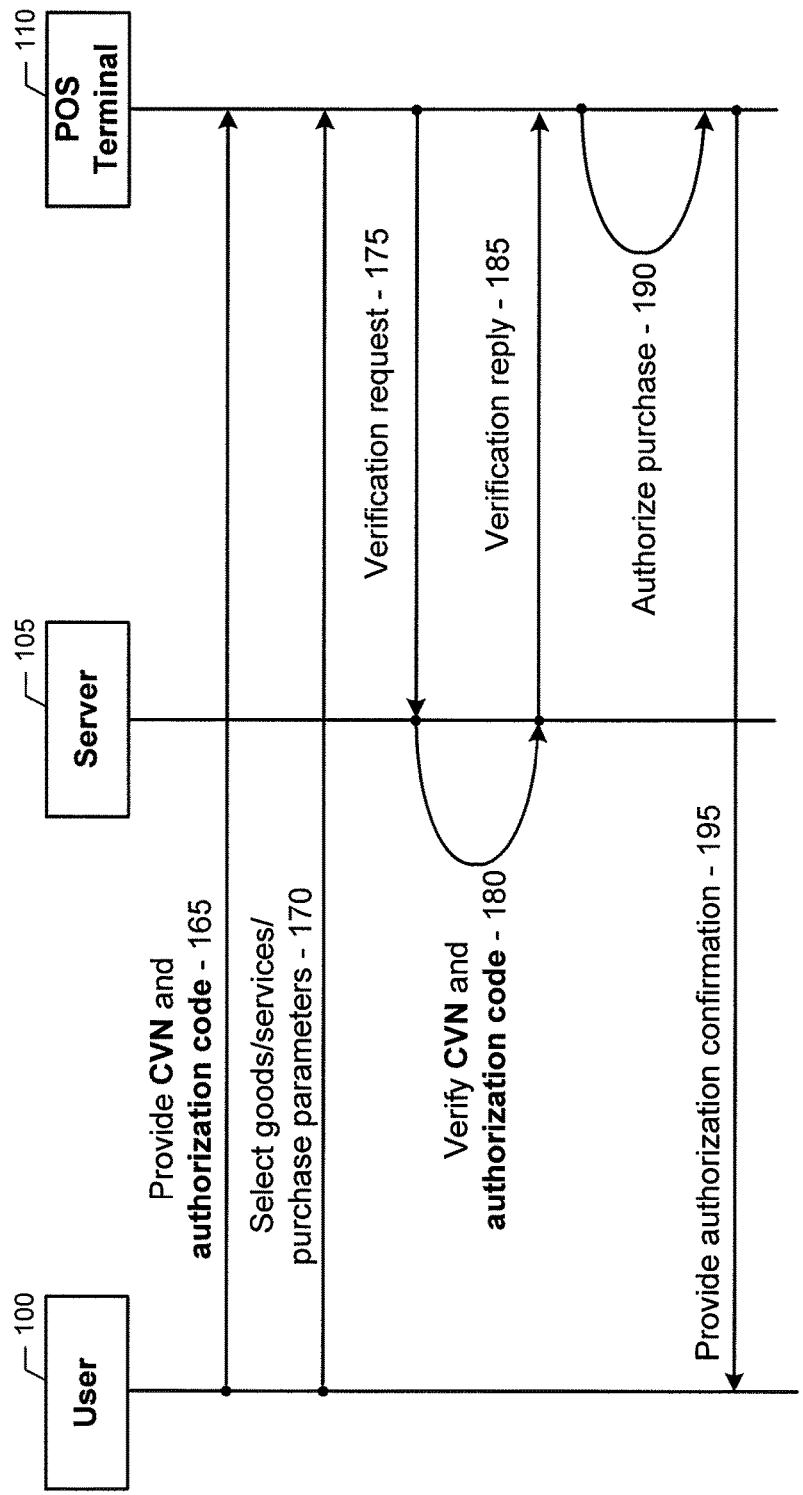
Figure 5:
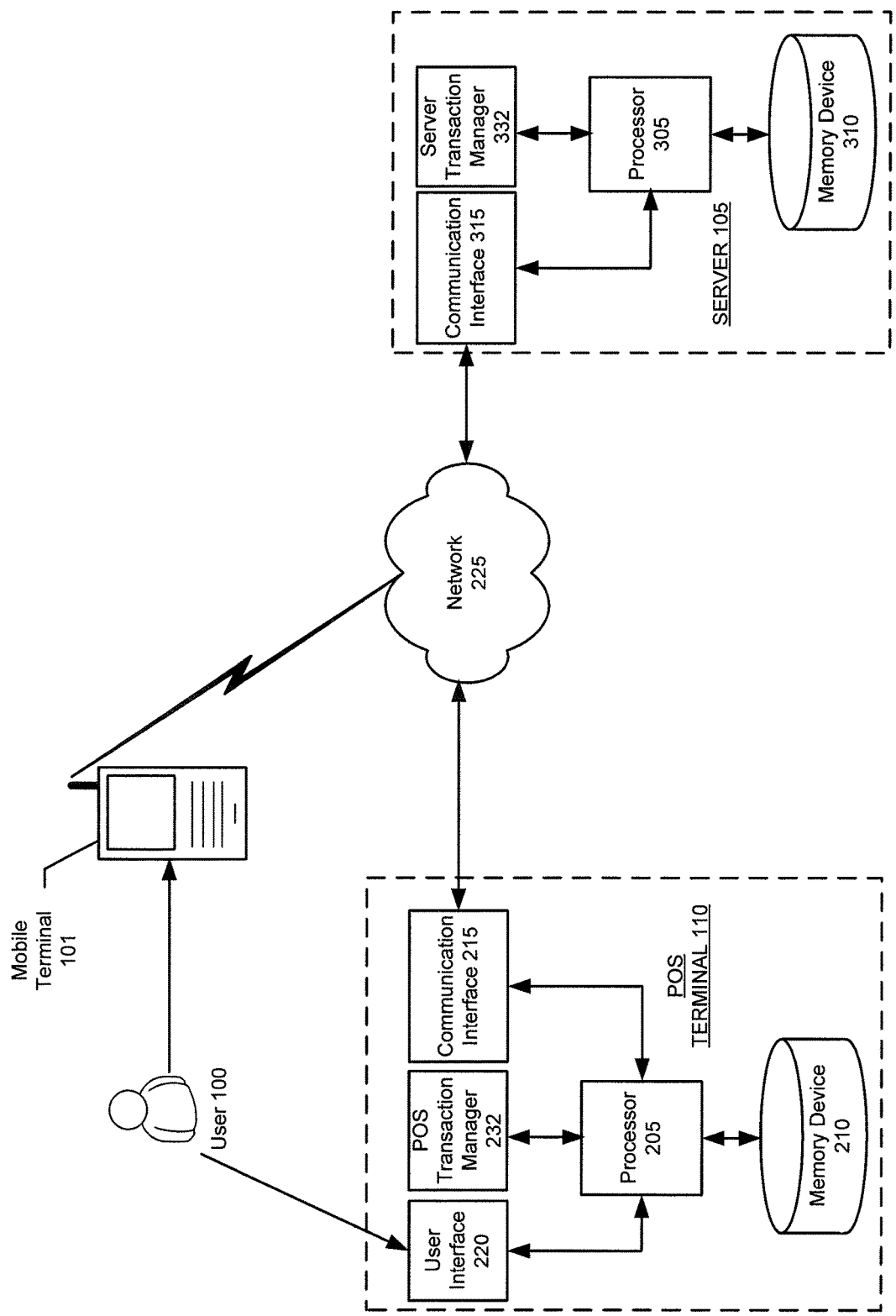

Having thus described embodiments of the invention in general terms, reference will now be made to the accompanying drawings, which are not necessarily drawn to scale, and wherein:

FIG. 1 illustrates a hierarchical diagram of a database structure for account setup and maintenance in accordance with various example embodiments of the present invention;

FIG. 2 is a signal and operational diagram of an example system in accordance with various example embodiments of the present invention;

FIG. 3 is a signal and operational diagram of a portion of the example system of FIG. 1 depicting the operations of, and the interactions between a mobile terminal and a server in accordance with example embodiments of the present invention;

FIG. 4 is a signal and operational diagram of another portion of the example system of FIG. 1 depicting the operations of, and the interactions between, a user, a server, and a point of sale terminal in accordance with example embodiments of the present invention; and FIG. 5 illustrates an example system and depicts block diagrams of some of the apparatuses according to example embodiments of the present invention

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the term "account" without the modifier "master" or "sub-" may be used generically to refer to either a master account or a sub-account.

Example embodiments of the present invention support and manage secure transactions by using multiple verification factors to access a funding source for the purchase of goods or services. A product or service provider, or a related third-party, may setup and maintain user accounts that allow users to conveniently and securely access funds for purchasing products and services from the product or service provider. At a broad level, an example transaction may involve a user requesting, via a mobile terminal, authorization from a transaction server that maintains the user accounts, to make a purchase at a point of sale terminal, which may also be maintained by the product or service provider, or the related third-party. The transaction server, or servers, may maintain, store, or have access to account information to facilitate performance of the transaction.

According to various example embodiments, the transaction server, as well as the point of sale (POS) terminal, may be operated and owned by a product or service provider (or a designated third-party) for the convenience and security of customers and the product or service provider. For example, a gasoline retailer (or a designated third-party) may operate and maintain a transaction server, configured to communicate with a user's mobile terminal and communicate with point of sale (POS) terminals. As such, the gasoline retailer may configure the server and the account information stored on or accessible to the server, to protect both the customer and the gasoline retailer from, for example, account misuse and fraud. The gasoline retailer (or the designated third-party) may also own and maintain point of sale (POS) terminals, such as pay-at-the-pump terminals and cash registers, which may be configured to support convenient and secure transactions in accordance with example embodiments of the present invention. As such, the POS terminal and the server, using predefined user account information stored at or accessible by the server, can facilitate a convenient and secure transaction.

FIG. 1 illustrates an example structure, such as a database structure, that can be used for account setup and maintenance according to various example embodiments of the present invention. In this regard, referring to FIG. 1, an account may be setup as a master account, which would be a highest level account. A number of parameters may be setup and maintained with respect to the master account. For example, a funding source may be defined in association with the master account. The funding source may be a bank account (e.g., checking, saving account), a credit card account, a brokerage account, or the like. In association with the funding source, parameters may be setup that facilitate accessing the funding source electronically, such as names of entities that hold the account, account numbers, routing numbers, passwords, passcodes, and the like. The funding source and associated parameters facilitate gaining access to funds available through the funding source for the purchase of goods and services. A backup funding source may also be defined, which could be used in the event that the funding source is unavailable for a transaction (e.g., insufficient funds available in the account of the funding source). The backup funding source may be associated with similar parameters as those described with respect to the funding source.

Continuing to refer to FIG. 1, a first verification parameter, a mobile terminal identifier (ID), may be defined and registered with respect to the master account. The mobile terminal ID may be a unique identifier of a mobile communications device owned by or otherwise associated with the user of the account. For example, the mobile terminal ID may be the phone number of a mobile phone owned by the user of the account. Transactions involving a mobile terminal may include verifying that a mobile terminal ID has been registered with an account as part of the authorization process, as further described below.

A second verification parameter, a customer verification number (CVN), may also be defined with respect to the master account. The customer verification number may be a numeric string, an alpha-numeric string, or other symbol code, defined by the user. A customer verification number may entered by a user during a transaction and compared against the customer verification number stored in association with the account to verify the identity of the user, or to at least verify that the user has knowledge of the customer verification number.

The master account may also be associated with any number of account rules and transaction restrictions. The account rules and transaction restrictions may be setup and maintained by the user or a product or service provider (e.g., gasoline retailer) that supports the account. Example account rules and transaction restrictions include location restrictions, type of good or service restrictions, currency amount limits, account frequency restrictions, minimum account balance restrictions, probation period restrictions, and the like. Parameters provided during the course of a transaction (e.g., authorization parameters and purchase parameters) may be checked against the account rules and transaction restrictions to determine whether a transaction should be authorized. The rules and restrictions can be implemented for the benefit of both the user and the product or service provider, since fraud can be reduced via implementation of rules and restrictions.

A location restriction may be a restriction on the places of business where a transaction may be completed. For example, geographic boundaries (e.g., state, county, city, zip code, area code, etc.) may be utilized to indicate that transactions at POS terminals located outside of the defined geographic boundaries are restricted. In this regard, the number of out-of-area transactions may be restricted to a predefined number within a given period of time before authorization is no longer provided. For example, the predefined number may be set to one out-area-transaction within a twenty-four hour time frame. As such, a first out-of-area transaction may be authorized, but a second out-of-area an hour later may be prevented. According to some example embodiments, the number of out-of-area transactions may be set to zero, thereby preventing all out-of-area transactions. Alternatively, a location restriction may identify one or more specific locations in a geographic area, such as a "home" gas station, or a gas station with a predefined radius of a home location or current physical location of the mobile terminal, such as determined by GPS information from the mobile terminal.

The location restriction may also refer to restrictions on locations where a POS terminal may be located. For example, a location restriction may indicate that only pay-at-the pump terminals may be used, and not inside cash registers at, for example, a convenience store.

A type of good or service restriction may limit the type of goods and services that may be purchased. For example, a type of good or service restriction may be set to "gasoline only," thereby preventing authorization for purchases that involve goods or services other than gasoline (e.g., groceries, alcohol, tobacco products, car wash, or the like).

A currency amount limit may be defined to limit the amount of money that may be authorized per transaction or over a period of time. For example, a currency amount restriction may set such that no more than $100 may be authorized in a twenty-four hour period. The currency amount limit may also operate as a fraud limit to reduce exposure to fraudulent use of the account, or excessive use of the account, such as by a teenager. According to some example embodiments, if a currency amount limit is exceeded, other fraud related rules and restrictions may be automatically modified to reduce the risk of further fraudulent use.

An account frequency restriction may also be defined which may limit how frequently transactions may be performed. In this regard, a threshold number of transactions may be defined within a given period of time. For example, an account frequency restriction may be set for one transaction in twenty-four hours. As such, a second transaction within a twenty-four hour window will not be authorized.

A minimum account balance restriction may also be defined. The minimum account balance restriction may be implemented in example embodiments where the transaction server (e.g., server 105) has access to the value of the funds available to the user. The minimum account balance may be set such that when the funds fall below the threshold, no further transactions will be authorized until the funds rise above the threshold again.

A probation period restriction may be defined by the product or service provider. The probationary period may implement any one or more of the other rules or restrictions to a different degree for a period of time. For example, a user may open an account and the probationary period may be set for one month or a billing cycle. During the one month, a more stringent currency amount limit and/or a frequency restriction may be enforced.

Account activity notification rules may also be defined. In this regard, some or all account activity and associated information may be reported to the user of the account. For example, an account activity notification rule may be defined that provides a message, such as a text message to the user's mobile terminal and/or an email to the user's email address, when a transaction is completed, as further described below. Account activity notification rules may be defined to notify a user of activity involving a sub-account.

Additional rules and restrictions may also be defined and implemented. For example, a rule may be defined by the product or service provider that automatically informs that credit agencies of a deficient account when a threshold time since last payment is passed, when a threshold outstanding balance is reached without timely payment, or the like. The thresholds may be dynamically configured such that the threshold for reporting missed payments to the credit agency may change with regular on-time payments for a given period of time.

According to various example embodiments, a master account may also be associated with sub-accounts (or subordinate accounts). Any number of sub-accounts may be generated under a master account, and the parameters described with respect to master accounts may also be defined for sub-accounts. For example, a sub-account may be associated with a different mobile terminal ID and customer verification number.

A sub-account may be implemented for situations where the entire account structure is for a family. The master account may be designated for use by one or both parents, while a spouse and/or the children may have sub-accounts. According to some example embodiments, modification of rules and restrictions on the sub-accounts may only be conducted by those with access to the master account. As such, heightened limitations may be placed on the utilization of a sub-account, as compared to those of the master account. Further, thresholds for account activity notifications may be more readily met, to allow, for example, a parent to closely monitor the account usage of a child. Similarly, a user utilizing the master account may be able to initiate transactions for a sub-account, but a user of a sub-account need not be able to initiate transactions on the master account or another sub-account.

According to some example embodiments, a sub-account and a master account may have the same mobile terminal ID. This situation may arise when a user associated with the master account and a user associated with the sub-account share a mobile terminal. To determine which account is being utilized, a sub-account or a master account may be defined with a different customer verification number and verification of the customer verification number can indicate the account that is being utilized for the transaction. Accordingly, and as further described below, verification of the mobile terminal ID during a transaction may be conducted such that the same mobile terminal ID may be registered for both the master and the sub-account. Further, in some example embodiments, a sub-account and a master account may share a customer verification number (e.g., for a user that shares multiple cell phones with different family members but wishes to maintain a uniform customer verification number across all of the shared cell phones).

Having described an example structure for an account, a description of an example system and process can be described with respect to FIGS. 2-5 that utilizes the verification parameters of the account. FIG. 2 illustrates a signaling and operational diagram of an example system in accordance with example embodiments of the present invention. The system includes a user 100, a mobile terminal 101, a server 105, and a point of sale (POS) terminal 110.

The mobile terminal 101 may be any type of mobile communications device, such as a mobile phone. According to some example embodiments, the mobile terminal 101 includes hardware and software to support short message service or text messaging. In this regard, the mobile terminal 101 may be configured to receive user input, via a user interface of the mobile terminal 101 for the user 100, in the form of text for inclusion in a text message. Subsequent to receiving the desired text via the user interface, the mobile terminal 101 may be configured to transmit the text message through a wireless network (e.g., cellular network) to a destination. Similarly, the mobile terminal 101 may be configured to wirelessly receive text messages from a sending device via, for example, a cellular network.

The server 105 may be any type of computing device with a communications interface configured to support communications with mobile terminal 101 and the POS terminal 110. In this regard, according to some example embodiments, the server 105 may be directly or indirectly (e.g., via another network) connected to, for example, the cellular network to support sending and receiving messages such as text messages. According to some example embodiments, the server 105 may be an entity connected to the Internet and also connected to the cellular network via a gateway between the cellular network and the Internet. The server 105 may also be connected to the POS terminal 110 via a network connection such as via the Internet or a proprietary network maintained by the owner or operator of the server 105 and the POS terminal 110.

The POS terminal 110 may be a computing and communications device located at a place of business. According to some example embodiments, the POS terminal 110 may be a cash register, a pay-at-the-pump terminal, an automated teller machine (ATM), a vending machine, or the like. In accordance with some example embodiments, the POS terminal 110 may be located at a virtual point of sale and the POS terminal 110 may be an online (e.g., the Internet) entity.

Referring again to FIG. 2, example embodiments of the present invention are described with respect to an example process, where user 100 initiates a secure transaction and the transaction is authorized. The user 100 may begin the process at 151 by composing a text message, or other type of message, addressed to a predetermined receiving entity such as the server 105. For example, the user 100 may compose a text message directed to a phone number associated with the server 105. The message may, but need not, include authorization parameters indicating, for example, an amount of money the user 100 is requesting authorization to spend.

The composed message may be transmitted by the mobile terminal 101, for example, as a text message to be received by the server 105 at operation 150. The message may take the form of an authorization code request to the server 105. The authorization code request may include or be accompanied by a mobile terminal ID for the mobile terminal 101, which may be automatically added as a "from" source address for the text message. Further, as mentioned above, the authorization code request may include authorization parameters. According to some example embodiments, the authorization code request does not include a customer verification number, and the mobile terminal 101 does not otherwise provide a customer verification number to the server 105.

The server 105 may be configured to receive the authorization code request and the mobile terminal ID and verify the mobile terminal ID at 155. To verify the mobile terminal ID, the server may access and search the user accounts (e.g., both master accounts and sub-accounts) to determine whether the mobile terminal ID has been registered and associated with an account. If the mobile terminal ID is associated with an account, then the mobile terminal ID may be verified. If the mobile terminal ID is not associated with an account, the mobile terminal ID is not verified, and an error notification may be provided to the mobile terminal 101 by the server 105.

In addition to verifying the mobile terminal ID, the server 105 may also determine whether authorization parameters included in the authorization code request violate account rules and transaction restrictions. For example, the authorization code request may include a requested amount of money for the transaction (e.g., $20). The server 105 may be configured to check the requested amount of money against, for example, a currency amount limit to ensure that the requested amount does not violate the rule or restriction. In the event that a rule or restriction would be violated, an error notification may be provided to the mobile terminal 101 and the transaction would not be authorized.

Additionally, some authorization parameters may not be associated with a rule or restriction, but may indicate optional parameters available for the transaction. For example, if a user has accrued some loyalty rewards that may be used as a discount against the purchase of goods and services, the amount of loyal rewards that a user wishes to use for a transaction may be provided as an authorization parameter. In this regard, the server 105 may verify the availability of loyalty rewards for use in the transaction.

In the event that no rule or restriction is violated and the mobile terminal ID has been verified, the server 105 may proceed with generating an authorization code at 155. The authorization code may be a random or pseudo-random numeric, alpha-numeric, bar, or symbol code designated for a transaction involving the account associated with the mobile terminal ID. The authorization code may be stored in association with the account having the registered mobile terminal ID, so that the authorization code may be later verified as described below.

The server 105 may then be configured to reply to the mobile terminal 101 with a message that includes the authorization code at 160. According to some example embodiments, the server 105 may compose the reply message and cause the reply message to be transmitted to the mobile terminal 101, for example, as a text message or Multimedia Messaging (MMS), such as with a bar code graphic. The server 105 may use the mobile terminal ID, such as a phone number of the mobile terminal, to address the reply message.

According to various example embodiments, the authorization code is now available to the user via a user interface of the mobile terminal 100. With the authorization code accessible to the user, the user may then travel to a place of business (if the user has not already done so). At the place of business the user may interface with a POS terminal 110 at 165. The user may provide the authorization code and a customer verification number to the POS terminal 110. The user may enter the customer verification number and the authorization code into a user interface of the POS terminal 110. According to various example embodiments, the user may provide the customer verification number to the POS terminal via hand entry on a key pad. According to some example embodiments, the authorization code may be communicated from the mobile terminal 101 to the POS terminal 110, via, for example, radio communications, such as Bluetooth communications, infra-red communications, a displayed bar code, or the like.

It is noteworthy, that, according to some example embodiments, the customer verification number was not used for verification to request and receive the authorization code. As such, the mobile terminal ID and the customer verification number may always remain separate in communication and may be only known to the user 100 and the server 105. Prior to providing the authorization code and the customer verification number to the POS terminal 110, these two security factors remained separated and were not included in a common message, request, or reply that may be intercepted by third-party (e.g., hacker). The authorization code and the customer verification number may therefore be derived from two separate sources, where the authorization code is generated by the server 105, after verifying the registration of the mobile terminal ID, and the customer verification number is provided, independent of the authorization code, by the user (e.g., from memory). According to various example embodiments, the disparate sources of the mobile terminal ID, the authorization code, and the customer verification number provide a multi-factor security function, such as requiring two separate two-factor security checks using three security factors.

Having provided the customer verification number and the authorization code to the POS terminal 110, goods or services purchase parameters may also be provided by the user, or another entity, to the POS terminal 110 at 170. In this regard, purchase parameters may include the amount of money required to purchase the good or services requested, the type of goods and services requested for purchase by the user, and the like. Alternatively, purchase parameters may be omitted if the necessary default parameters are used or if the authorization parameters would suffice. In this regard, an authorization code may be generated with respect to authorization parameters that defined the goods or services, such as $20 of unleaded 87 octane gasoline.

In turn, the POS terminal 110 may transmit, and the server 105 may receive, a verification request at 175. The verification request may include a customer verification number provided by the user to the POS terminal 110, and an authorization code provided by the user, or the mobile terminal 101, to the POS terminal 110. According to various example embodiments, the verification request may also include the purchase parameters received at 170, as well as other purchase parameters provided by the POS terminal 110, such as the current date and time, the location of the POS terminal 110 (e.g., the geographic location), and the like.

At 180, the server 105 may receive the verification request and verify the received customer verification number and the received authorization code. In this regard, the server 105 may search through the user account information to determine whether the received customer verification number and the received authorization code match a customer verification number and an authorization code associated with the same account. If a match is found, the customer verification number and the authorization code may be verified, and the transaction may proceed. If no match is found, an error notification may be provided to the POS terminal 110 to inform the user that an error has occurred.

In addition to verifying the received customer verification number and the received authorization code at 180, the server 105 may also be configured to ensure that the received purchase parameters do not violate an account rule or transaction restriction. For example, based on the current time and date an account frequency restriction may be checked. In the event that an account rule or transaction restriction is violated, an error notification may be provided to the POS terminal 110.

At 185, upon verifying the customer verification number and the authorization code, the server 105 may be configured to transmit a verification reply to the POS terminal 110. The verification reply may indicate that the transaction may proceed. In response, the POS terminal 110 may be configured to authorize the purchase at 190, and provide authorization confirmation to the user at 195. According to some example embodiments, the POS terminal 110 may be configured to transmit transaction information (e.g., cost of products or services purchased, types of products or services purchased, indication that the transaction was successful or failed, etc.) to be received by the server 105. Additionally, in the event that the account associated with the customer verification number has appropriate account activity notification rules defined, the server 105 may be configured to cause transmission of a notification at 196 to a mobile terminal or other destination (e.g., email address) associated with the account (or a related master account) to provide notification to a user that a transaction has occurred or was denied.

Additionally, in accordance with various example embodiments, upon completion of a transaction, a loyalty reward may be computed by the server 105 for the transaction, for example, based on the cost of the products or services purchased, a number of consecutive on-time payments, or the like. The loyalty reward may be part of a retailer's marketing campaign that rewards customers of the business and encourages return business. The loyalty rewards may operate as discounts off future purchases. According to some example embodiments, upon completing a transaction, a message may be sent by the server 105 to be received by the user's mobile terminal indicating the loyalty rewards that have been accrued as a result of the transaction or other activity.

In accordance with various example embodiments, the server 105 may also be configured to perform price lock-in functionality. An account may be registered and set-up for the price-lock functionality. In this regard, a user may request, via an authorization code request on a mobile terminal, to spend particular monetary amount for a variable quantity product for a period of time. In this regard, an authorization code request may include price lock parameters, such as a desired product, a desired price, a desired quantity, and a desired time. For example, a user may request to price-lock $20 for 10 gallons of 87 octane gasoline for the next twenty-four hours. If the user requests and purchases the gasoline in accordance with example embodiments of the present invention as described herein, the user can obtain the 10 gallons of gasoline, having $20 deducted from their account. In the event that the user fails to obtain all 10 gallons (e.g., gas tank is full), $20 or a pro-rated amount would still be deducted from the account. Variable quantity price-lock may also be implemented with an additional surcharge for the flexibility. Whether a set-quantity or variable-quantity price-lock is implemented, a maximum amount of product for purchase may be set. Additionally, surcharges (e.g., $1, 5% of potential sale, or the like) may be levied for incomplete price-lock transactions, such as unfilled requests for a price-lock or unaccepted offers for a price-lock. Failed transaction may also result in an account being barred from, or placed on probation with respect to, future price-lock activity.

Price check functionality may also be implemented by the server 105. In this regard, the server 105 may identify the location of the mobile terminal 101 and provide information regarding nearby product pricing, possibly upon request by the mobile terminal 101. For example, using a provided zip code, a place of business code (e.g., gas station code), global positioning information provided by the mobile terminal, or the like the server may provide nearby product pricing information. Further, in the event that travel plan information is provided to the server 105, the server 105 may determine and report back optimal locations for the purchase of products along the travel plan. In the event that the product is gasoline, a vehicles gas mileage and tank capacity may be considered. According to various example embodiments, surcharges (e.g., $1, 5% of potential sale, or the like) may be levied for use of the price check functionality. Additionally, restriction on the frequency of use for price check functionality, possibly related to completed transactions.

As mentioned above, according to various example embodiments, the mobile terminal ID, authorization code, and customer verification number may be derived form different sources during a transaction. FIGS. 3 and 4 depict sub-portions of FIG. 2 to reinforce this concept, as well as illustrate the multi-factor security that is implemented by various example embodiments. FIG. 3 depicts the interactions between the mobile terminal 101 and the server 105 to request and receive an authorization code based on the verification that a registered mobile terminal ID was provided. FIG. 4 depicts the interactions between the user 100, the POS terminal 110, and the server 105, to separately verify the authorization code and the customer verification number. Note that the POS terminal 110 may not be privy to the mobile terminal ID, because the mobile terminal ID is not included in the authorization code request or generation. Also note that the mobile terminal need not be privy to the customer verification number, since the customer verification number is not included in any communications transmitted or received by the mobile terminal.

FIG. 5 illustrates a structural block diagram of the system of FIG. 2, including exploded block diagrams of some example apparatus according to the present invention, including the server 105 and the POS terminal 110. The network cloud 225 is representative of any wired or wireless network, or combination thereof, that supports the communications between the mobile terminal 101, the server 105, and the POS terminal 110.

According to various example embodiments, the server 105 and the POS terminal 110 may be, or be included within a computing device that supports and/or utilizes network communications and configured as described above to perform their respective functionality. In some example embodiments, the mobile terminal 101 may be configured to perform the functionality described above, and may include or be included within a computer or a mobile terminal such as a mobile telephone, a portable digital assistant (PDA), a pager, a mobile television, a gaming device, a mobile computer, a laptop computer, an audio/video player, a radio, and/or a global positioning system (GPS) device, any combination of the aforementioned, or the like.

The example server 105 and the POS terminal 110, referring to FIG. 5, respectively include or are otherwise in communication with processors 205 and 305, memory devices 210 and 310, and communications interfaces 215 and 315. POS terminal also includes a user interface 220 and a POS transaction manager 232. Server 105 also includes a server transaction manager 332.

The processors 205 and 305 may be embodied as various means for implementing various functionality of example embodiments of the present invention including, for example, microprocessors, coprocessors, controllers, special-purpose integrated circuits such as, for example, ASICs (application specific integrated circuits), FPGAs (field programmable gate arrays), or hardware accelerators, processing circuitry or the like. According to one example embodiment, processors 205 and 305 may be representative of a plurality of processors operating in concert. The processors 205 and 305 may, but need not, include one or more accompanying digital signal processors. In some example embodiments, the processors 205 and 305 are configured to execute instructions stored in respective memory devices 210 and 310 or instructions otherwise accessible to the processors 205 and 305. Whether configured as hardware or via instructions stored on a computer-readable storage medium, or by a combination thereof, the processors 205 and 305 may be an entity capable of performing operations according to embodiments of the present invention while configured accordingly. Thus, in example embodiments where the processors 205 and 305 are embodied as an ASIC, FPGA, or the like, the processors 205 and 305 are specifically configured hardware for conducting the operations described herein. Alternatively, in example embodiments where the processors 205 and 305 are embodied as an executor of instructions stored on a computer-readable storage medium, the instructions specifically configure the processors 205 and 305 to perform the algorithms and operations described herein. In some example embodiments, the processors 205 and 305 are processors of a specific device (e.g., server or POS terminal) configured for employing example embodiments of the present invention by further configuration of the processors 205 and 305 via executed instructions for performing the algorithms and operations described herein.

The memory devices 210 and 310 may be one or more computer-readable storage media that may comprise volatile and/or non-volatile memory. The memory devices 210 and 310 may be contrasted with a computer-readable transmission medium, such as a propagating signal. In some example embodiments, the memory devices 210 and 310 comprise Random Access Memory (RAM) including dynamic and/or static RAM, on-chip or off-chip cache memory, and/or the like. Further, memory devices 210 and 310 may comprise non-volatile memory, which may be embedded and/or removable, and may comprise, for example, read-only memory, flash memory, magnetic storage devices (e.g., hard disks, floppy disk drives, magnetic tape, etc.), optical disc drives and/or media, non-volatile random access memory (NVRAM), and/or the like. Memory devices 210 and 310 may comprise a cache area for temporary storage of data. In this regard, some or all of memory devices 210 and 310 may be included within the respective processors 205 and 305.

Further, the memory devices 210 and 310 may be configured to store information, data, applications, computer-readable program code instructions, or the like for enabling the processors 205 and 305 to carry out various functions in accordance with example embodiments of the present invention described herein. For example, the memory devices 210 and 310 could be configured to buffer input data for processing by the processors 205 and 305. Additionally, or alternatively, the memory devices 210 and 310 may be configured to store instructions for execution by the respective processors 205 and 305.

The communication interfaces 215 and 315 may be any device or means embodied in either hardware, a computer program product, or a combination of hardware and a computer program product that is configured to receive and/or transmit data from/to a network and/or any other device or module in communication with the server 105 or the POS terminal 110. Processors 205 and 305 may also be configured to facilitate communications via the communications interface by, for example, controlling hardware included within the respective communications interfaces 215 and 315. In this regard, the communication interfaces 215 and 315 may comprise, for example, one or more antennas, a transmitter, a receiver, a transceiver and/or supporting hardware, comprising a processor for enabling communications with network 225. Via the communication interfaces 215 and 315 and the network 220, the example apparatus 200 may communicate with various other network entities in a device-to-device fashion and/or via indirect communications via a base station, access point, server, gateway, router, or the like.

The communications interfaces 215 and 315 may be configured to provide for communications in accordance with any wired or wireless communication standard or communications technique. For example, the communications interface may be configured to communication using techniques involving radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), and/or the like.

The user interface 220 of the POS terminal may be in communication with the processor 205 to receive user input via the user interface 220 and/or to present output to a user as, for example, audible, visual, mechanical or other output indications. The user interface 220 may comprise, for example, a keyboard, a mouse, a joystick, a display (e.g., a touch screen display), a microphone, a speaker, or other input/output mechanisms.

The POS transaction manager 232 of the POS terminal 110 and server transaction manager 332 of the server 105 may be any means or device embodied, partially or wholly, in hardware, a computer program product, or a combination of hardware and a computer program product, such as processors 205 or 305 implementing stored instructions to configure the POS terminal 110 or the server 105, or hardware configured processors 205 and 305, that are configured to carry out the functions of the POS terminal 110 and the server 105 as described herein. In an example embodiment, the processors 205 and 305 include, or control, the POS transaction manager 232 and the server manager 332. The POS transaction manager 232 and the server manager 332 may be, partially or wholly, embodied as processors similar to, but separate from processors 205 and 305. In this regard, the POS transaction manager 232 and the server manager 332 may be in communication with the processors 205 and 305. In various example embodiments, the POS transaction manager 232 or the server manager 332 may, partially or wholly, reside on distributed apparatuses such that some or all of the functionality of the POS transaction manager 232 or the server manager 332 may be performed by a first apparatus, and the remainder of the functionality of the POS transaction manager 232 or the server manager 332 may be performed by one or more other apparatuses.

FIGS. 2-4 illustrate operational diagrams of example systems, methods, and/or computer program products according to example embodiments of the invention. It will be understood that each operation of the operational diagrams, and/or combinations of operations in the operational diagrams, can be implemented by various means. Means for implementing the operations of the operational diagrams, combinations of the operations in the operational diagrams, or other functionality of example embodiments of the present invention described herein may include hardware, and/or a computer program product including a computer-readable storage medium (as opposed to a computer-readable transmission medium) having one or more computer program code instructions, program instructions, or executable computer-readable program code instructions stored therein. In this regard, program code instructions may be stored on a memory device, such as memory devices 210 and 310, of an example apparatus, such as server 105 and POS terminal 110, and executed by a processor, such as the processors 205 or 305. As will be appreciated, any such program code instructions may be loaded onto a computer or other programmable apparatus (e.g., processors 205 and 305, memory devices 210 and 310, or the like) from a computer-readable storage medium to produce a particular machine, such that the particular machine becomes a means for implementing the functions specified in the operational diagrams' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the operational diagrams' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the operational diagrams' operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of steps, elements, and/or materials than those explicitly described above are also contemplated as may be set forth in some of the appended claims. Accordingly, the specification and drawings are to be regarded in an illustrative rather than restrictive sense. Although specific terms are employed herein, they are used in a generic and descriptive sense only and not for purposes of limitation.

What is claimed is:

1. A method comprising:
receiving an authorization code request and a mobile terminal identifier to initiate a transaction, the received mobile terminal identifier being associated with a mobile terminal, the authorization code request comprising a requested currency amount to facilitate the transaction;
verifying, by a processor, that the mobile terminal identifier is registered with an account, the mobile terminal identifier and a customer verification number being associated with the account, the customer verification number having not been included in the authorization code request;
generating an authorization code in response to verifying that the mobile terminal identifier is registered;
storing the authorization code in association with the account;
providing for transmission of the authorization code to the mobile terminal;
receiving a verification request from a point of sale terminal in response to the point of sale terminal receiving a request for purchase of goods or services, the verification request including a received authorization code, a received customer verification number, and one or more purchase parameters associated with the goods or services requested for purchase, provided to the point of sale terminal by a user;
verifying that the received authorization code matches the authorization code stored in association with the account, and the received customer verification number matches the customer verification number associated with the account;
verifying that the purchase parameters do not violate one or more predetermined restrictions defined to prohibit or limit the purchase of the goods or services; and
providing for transmission of a verification reply to the point of sale terminal to authorize the transaction in response to verifying that the received authorization code matches the authorization code stored in association with the account, the received customer verification number matches the customer verification number associated with the account and that the purchase parameters do not violate the predetermined restrictions defined to prohibit or limit the purchase of the goods or services associated with the transaction.

2. The method of claim 1, wherein receiving the authorization code request includes receiving the authorization code request, the authorization code request including price lock parameters.

3. The method of claim 1, wherein the restrictions comprise at least one of a location restriction, a type of good or service restriction, a currency amount limit, an account frequency restriction, or a probation period restriction.

4. The method of claim 1, wherein verifying the received authorization code and the received customer verification number includes verifying that the received authorization code matches the authorization code stored in association with the account, and the received customer verification number matches the customer verification number associated with the account, the account being a sub-account of a master account, and wherein the customer verification number is associated with the sub-account.

5. The method of claim 4 further comprising providing for transmission of a notification message indicating transaction activity of the sub-account to a mobile terminal associated with the master account.

6. The method of claim 1, wherein verifying the received authorization code and the received customer verification number includes verifying that the received authorization code matches the authorization code stored in association with the account, and the received customer verification number matches the customer verification number associated with the account, the account being a sub-account of a master account, wherein the mobile terminal identifier is associated with both the master account and the sub-account.

7. The method of claim 1, wherein receiving the authorization code request includes receiving authorization parameters, the authorization parameters including the requested currency amount;
wherein verifying that the mobile terminal identifier is registered includes verifying that the authorization parameters do not violate a transaction restriction; and
wherein generating the authorization code includes generating the authorization code in response to verifying that the authorization parameters do not violate an account rule or transaction restriction.

8. An apparatus comprising:
a processor; and
a memory comprising computer software, which when executed by the processor causes the apparatus to:
receive an authorization code request and a mobile terminal identifier to initiate a transaction, the mobile terminal identifier being associated with a mobile terminal, the authorization code request comprising a requested currency amount to facilitate the transaction;
verify that the mobile terminal identifier is registered with an account, the mobile terminal identifier and a customer verification number being associated with the account, the customer verification number having not been included in the authorization code request;
generate an authorization code, in response to verifying that the mobile terminal identifier is registered;
store the authorization code in association with the account;
provide for transmission of the authorization code to the mobile terminal;
receive a verification request from a point of sale terminal in response to the point of sale terminal receiving a request for purchase of goods or services, the verification request including a received authorization code, a received customer verification number, and one or more purchase parameters associated with the goods or services requested for purchase, provided to the point of sale terminal by a user;
verify that the received authorization code matches the authorization code stored in association with the account, and the received customer verification number matches the customer verification number associated with the account;
verify that the purchase parameters do not violate one or more predetermined restrictions defined to prohibit or limit the purchase of the goods or services; and
provide for transmission of a verification reply to the point of sale terminal to authorize the transaction in response to verifying that the received authorization code matches the authorization code stored in association with the account, the received customer verification number matches the customer verification number associated with the account, and that the purchase parameters do not violate the predetermined restrictions defined to prohibit or limit the purchase of the goods or services associated with the transaction.

9. The apparatus of claim 8, wherein the memory and the computer software are further configured to, when executed by the processor, cause the apparatus to:
receive the authorization code request by receiving the authorization code request via a short message service transmission; and
provide for transmission of the authorization code by providing for transmission of the authorization code via a short message service transmission.

10. The apparatus of claim 8, wherein
the restrictions comprise at least one of a location restriction, a type of good or service restriction, a currency amount limit, an account frequency restriction, or a probation period restriction.

11. The apparatus of claim 8, wherein the memory and the computer software are further configured to, when executed by the processor, cause the apparatus to:
verify the received authorization code and the received customer verification number by verifying that the received authorization code matches the authorization code stored in association with the account, and the received customer verification number matches the customer verification number associated with the account, the account being a sub-account of a master account, and wherein the customer verification number is associated with the sub-account.

12. The apparatus of claim 11, wherein the memory and computer software are further configured to, when executed by the processor, cause the apparatus to:
provide for transmission of a notification message indicating transaction activity of the sub-account to a mobile terminal associated with the master account.

13. The apparatus of claim 8, wherein the memory and computer software are further configured to, when executed by the processor, cause the apparatus to:
verify the received authorization code and the received customer verification number by verifying that the received authorization code matches the authorization code stored in association with the account, and the received customer verification number matches the customer verification number associated with the account, the account being a sub-account of a master account, wherein the mobile terminal identifier is associated with both the master account and the sub-account.

14. The apparatus of claim 8, wherein the memory and the computer software are further configured to, when executed by the processor, cause the apparatus to:
receive the authorization code request by receiving authorization parameters, the authorization parameters including the requested currency amount;
verify that the mobile terminal identifier is registered by verifying that the authorization parameters do not violate a transaction restriction; and
generate the authorization code by generating the authorization code in response to verifying that the authorization parameters do not violate an account rule or transaction restriction.

15. The apparatus of claim 8, wherein the authorization code request comprises price lock parameters.

16. A non-transitory computer-readable storage medium having executable computer-readable program code instructions stored therein, the computer-readable program code instructions configured to cause an apparatus to:

receive an authorization code request and a mobile terminal identifier to initiate a transaction and request generation of an authorization code, the mobile terminal identifier being associated with a mobile terminal, the authorization code request comprising a requested currency amount to facilitate the transaction;

verify that the mobile terminal identifier is registered with an account, the mobile terminal identifier and a customer verification number being associated with the account, the customer verification number having not been included in the authorization code request;

receive a verification request from a point of sale terminal in response to the point of sale terminal receiving a request for purchase of goods or services, the verification request including a received authorization code, a received customer verification number, and one or more purchase parameters associated with the goods or services requested for purchase, provided to the point of sale terminal by a user;

verify that the received authorization code matches an authorization code stored in association with the account, and the received customer verification number matches the customer verification number associated with the account;

verify that the purchase parameters do not violate one or more predetermined restrictions defined to prohibit or limit the purchase of the goods or services; and provide for transmission of a verification reply to the point of sale terminal to thereby authorize the transaction in response to verifying that the received authorization code matches the authorization code stored in association with the account, the received customer verification number matches the customer verification number associated with the account, and that the purchase parameters do not violate the predetermined restrictions defined to prohibit or limit the purchase of the goods or services associated with the transaction.

17. The computer-readable storage medium of claim 16, wherein the instructions configured to cause the apparatus to receive the authorization code request includes being configured to cause the apparatus to receive the authorization code request via a short message service transmission and wherein providing for transmission of the authorization code includes providing for transmission of the authorization code via a short message service transmission.

18. The computer-readable storage medium of claim 16, wherein the restrictions comprise at least one of a location restriction, a type of good or service restriction, a currency amount limit, an account frequency restriction, or a probation period restriction.

19. The computer-readable storage medium of claim 16, wherein the instructions configured to cause the apparatus to verify the received authorization code and the received customer verification number include being configured to cause the apparatus to verify that the received authorization code matches the authorization code stored in association with the account, and the received customer verification number matches the customer verification number associated with the account, the account being a sub-account of a master account, and wherein the customer verification number is associated with the sub-account.

20. The computer-readable storage medium of claim 19, wherein the instructions are further configured to cause the apparatus to provide for transmission of a notification message indicating transaction activity of the sub-account to a mobile terminal associated with the master account.

21. The computer-readable storage medium of claim 16, wherein the instructions configured to cause the apparatus to verify the received authorization code and the received customer verification number include being configured to cause the apparatus to verify that the received authorization code matches the authorization code stored in association with the account, and the received customer verification number matches the customer verification number associated with the account, the account being a sub-account of a master account, wherein the mobile terminal identifier is associated with both the master account and the sub-account.

22. The computer-readable storage medium of claim 16, wherein the instructions configured to cause the apparatus to receive the authorization code request include being configured to cause the apparatus to receive authorization parameters, the authorization parameters including the requested currency amount;
wherein the instructions configured to cause the apparatus to verify that the mobile terminal identifier is registered include being configured to cause the apparatus to verify that the authorization parameters do not violate a transaction restriction; and
wherein the instructions configured cause the apparatus to generate the authorization code include being configured to cause the apparatus to generate the authorization code in response to verifying that the authorization parameters do not violate an account rule or transaction restriction.

23. The computer-readable storage medium of claim 16, wherein the instructions configured to cause the apparatus to receive the authorization code request include being configured to cause the apparatus to receive the authorization code request, the authorization code request including price lock parameters.

* * * * *